Figure 1:
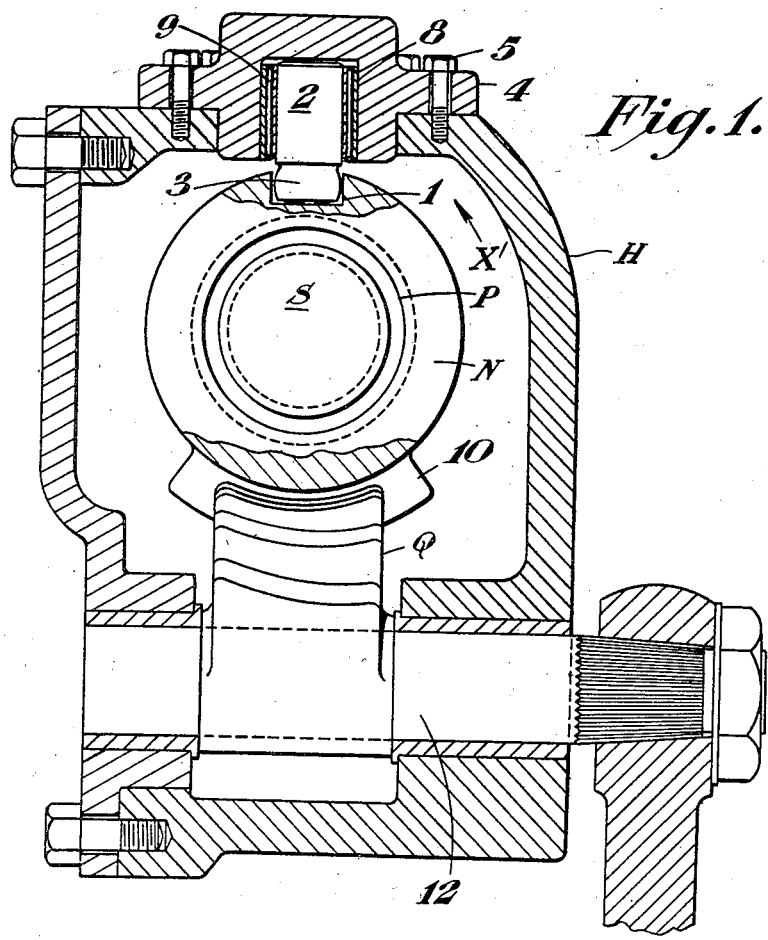

Nov. 25, 1952 — A. P. M. COCHRANE — 2,619,417
SCREW AND NUT ACTUATING GEAR
Filed July 18, 1951 — 3 Sheets-Sheet 1

Inventor:
Alfred Paul Mill Cochrane;
By his attorneys,
Baldwin, Wight & Brevoot

Nov. 25, 1952     A. P. M. COCHRANE     2,619,417
SCREW AND NUT ACTUATING GEAR
Filed July 18, 1951     3 Sheets-Sheet 3
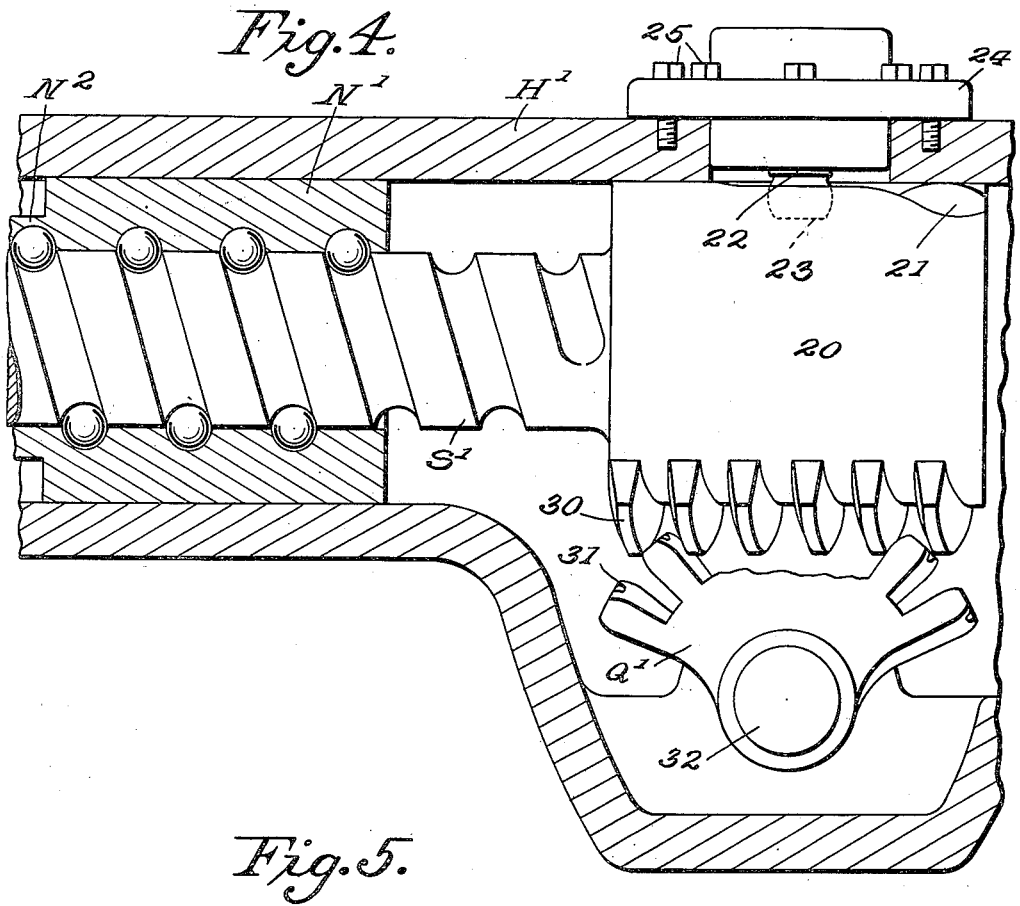
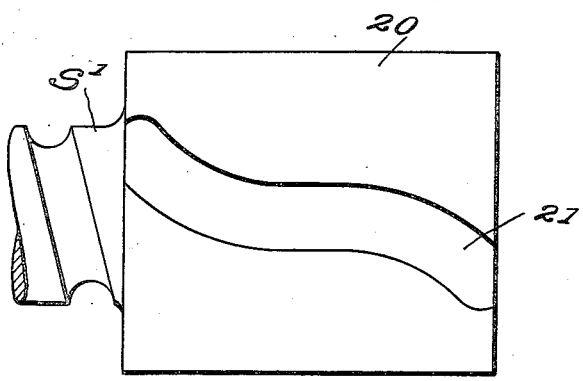
INVENTOR
Alfred Paul Mill Cochrane
BY G. Mallo Prevost
ATTORNEY Patented Nov. 25, 1952

2,619,417

UNITED STATES PATENT OFFICE 2,619,417

SCREW AND NUT ACTUATING GEAR

Alfred Paul Mill Cochrane, West Tempar,
Kinloch-Rannoch, Scotland

Application July 18, 1951, Serial No. 237,419
In Great Britain December 2, 1948

14 Claims. (Cl. 74—500)

This invention relates to new and useful improvements in screw and nut actuating gear, especially adapted for use in steering mechanisms, and is a development of the mechanism which is the subject of my prior British patent, No. 605,205, and corresponding United States Patent No. 2,489,534, the present application being a continuation-in-part of my co-pending application, Serial No. 128,050, filed November 18, 1949.

In the arrangement which is described in said U. S. Patent No. 2,489,534, it will be seen that mechanical leverage between the nut and the rocker arm is the main characteristic which assumes change at various angular positions of the said rocker arm. This alters the distance the nut must travel to produce a given unit of angular displacement of the rocker arm and, incidentally, there result changes in the ratio between the driving member and the driven member.

The present invention has for its primary object to secure controlled acceleration or deceleration of ratio in either direction from a central position (i. e. in a steering gear, the central ahead position) of the rocker arm in relation to the driving member (i. e. in a steering gear, the hand wheel), in a better and simpler mechanical design and to a greater practical extent, relying entirely upon the threads or gearing comprising the engagement of the driving and driven members.

A further object of the invention is to provide a variable ratio, within a working range, between a driving worm threaded screw and its correspondingly threaded nut or sleeve and between the said nut or sleeve and a driven worm threaded sector or wheel, the leads of the respective threads being constant but, preferably, widely different, by the utilization of contrary or "lost" motion between the said threads as a result of the controlled rocking motion of the member connecting the driving element to the driven element. In the arrangement illustrated, three members are shown, a driving screw, and intermediate nut or sleeve and the driven sector. An alternative arrangement of the three members could be a driving nut or sleeve, a driven screw having an enlarged head on which are machined the guiding slot and the threaded worm engaging the sector. The whole is suitably encased in a supporting housing.

A further object is to provide a simple method to take up some possible back-lash as a result of wear between the elements of the driven and intermediate members.

One form of mechanism contemplated by this invention comprises a screw and nut, the nut being restrained in its rotary motion by a pin and spherical headed roller thereon engaged in a restraining and guiding slot generated to any desired straight or curved course along the axial displacement of the nut on its screw. This slot can be either cut into the nut wall metal and the pin suitably held in the housing or a cover plate thereto, or the pin can form part of the nut and the slot be cut in the housing metal or a cover plate thereto.

A second form of the invention contemplates a reversal of the above structure wherein the nut is the driving element and the screw the driven element, the latter being restrained in its rotary motion by a pin engaged in a restraining and guiding slot in an enlarged end on the screw. As in the first form, this slot can be either cut into the metal of the enlarged end of the screw and the pin suitably held in the housing, or the pin can form a part of the enlarged end of the screw and the slot be cut in the housing metal or a cover plate thereto.

In either form the driven member, whether the nut or the screw, carries a worm geared rack, preferably at 180 degrees to the guiding pin, but not essentially in such a position, in mesh with a similar worm geared sector which, in turn, operates a shaft such as the pitman shaft on a vehicle steering gear or other driven member.

In operation, when adapted to a vehicle steering gear, the practical objective is to secure easier manipulation of the hand-wheel towards extreme lock positions. This objective is attained as follows. When the steering hand wheel is turned the screw will propel the nut member along the screw axis. If progression be without any rotating motion of the nut member the ratio would be constant. However, as soon as the longitudinal axis of the restraining slot has any variation from the axis of the screw the engaging pin will impart a rotary motion to the nut. The above objective is attained when the guiding slot is so inclined that the nut is caused to rotate to a given degree co-incidentally with the driving screw. A given "lost" motion results between nut and screw. Similarly, and depending upon whether the driving screw has a right hand or left hand thread, a suitably directional worm is machined or affixed to the outside surface of the nut, engaging a correspondingly threaded sector or wheel, so that there results further contrary or "lost" motion in the secondary drive. The overall change in ratio or lost movement can be calculated by the factors of the screw lead, the angular rotation of the nut and the worm lead. It is obvious that if the guiding slot be inclined in the opposite directions, from the straight ahead position, so that the nut rotates in the opposite direction to the driving screw member—all other factors remaining—there will be accelerated movement of the sector or wheel in relation to the screw lead, in both directions away from the central ahead position.

With the reverse form of assembly wherein the screw is the driven member for transmitting the motion to the steering gear through the worm threaded sector arm, a similar result is obtained.

With the above and other objects in view, my invention consists in the novel features herein set forth, illustrated in the accompanying drawings and more particularly pointed out in the appended claims.

Referring to the drawings which illustrate the invention as applied to a steering mechanism for a motor vehicle and in which numerals of like character designate similar parts throughout the several views.

Figure 3:
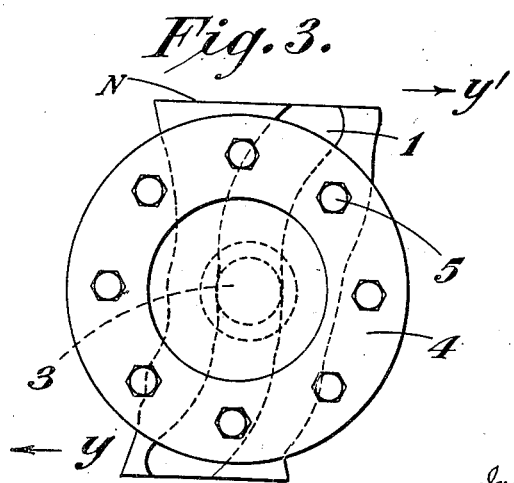
Figure 2:
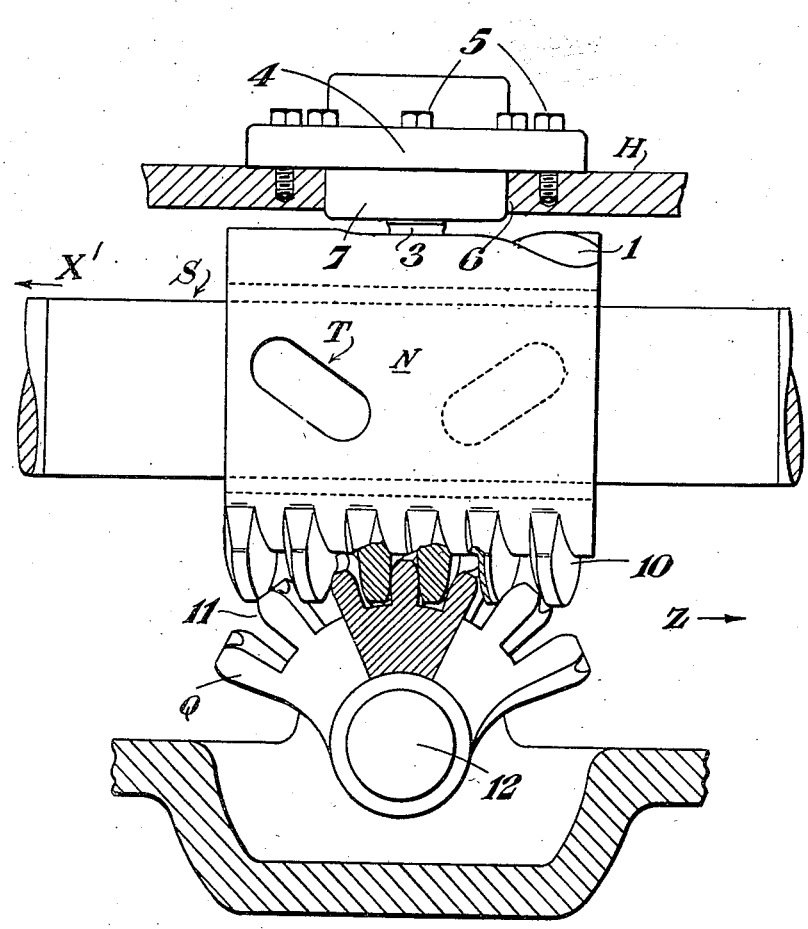

Figure 1 is an end-on view showing the steering column including the worm and nut and the sector arm coupled thereto, in this instance the worm or screw being the driving member and the nut the driven member, Figure 2 is a view of the same mechanism shown in side elevation, Figure 3 is a fragmentary plan view showing the shape of the slot in the nut, Figure 4 is a view generally similar to Figure 2 but illustrating a modified form of the invention wherein the nut is the driving member and the screw the driven member, and Figure 5 is a fragmentary top plan view of the slotted and enlarged end of the modified screw or worm.

Referring first to Figures 1 to 3 of the drawings, S indicates generally a screw on which is carried a nut N. As applied to a steering mechanism for a motor vehicle the screw S forms part of or is attached to the steering column, not shown, so that on rotating the screw S the nut N will be translated along screw shaft S.

The screw shaft S is supported in suitable bearings, not shown, and in the embodiment illustrated is mounted in a housing, part of the wall of which is indicated at H, Figure 2. Movement of the nut N is transmitted to a member hereinafter termed the sector being indicated at Q, and from which motion is transmitted to the steering axle.

Motion of the screw S may be transmitted to and from the nut N by balls contained in a single helix or helices and having a transfer passage as in my prior United States Patent No. 2,519,777, issued August 22, 1950, the path of the balls being indicated in dotted lines at P in Figure 1, and the transfer segment at T (Figure 2), or a plain screw thread might be used.

In the screw and nut actuating gear of this invention the nut N is controlled in its rotary motion with the object of accelerating or decelerating its linear movement up or down the shaft S. For this purpose it is formed with a slot 1 within which engages a stud 2 provided with an anti-friction roller head 3, the stud 2 being rotatably carried in a detachable flanged cover plate or cap piece 4 secured by set screws 5 to the wall of the housing H, which is cut away as at 6 to form a circular opening to receive an annular shoulder 7 on the cap piece 4. In the cap piece 4 is a recess 8 in which the stud 2 is rotatably mounted by means of needle roller bearings 9 and it will be observed that the fixing of the seating for the stud is circular, thus permitting of the orientation of the seating of the stud for a purpose to be hereinafter explained. While I have shown the stud as provided with a solid head and also mounted in an anti-friction seat, it will be obvious that I may provide a stud having an anti-friction head but mounted in a solid seat or any combination thereof.

Translational movement of the nut N is transmitted to the sector arm Q by means of a mutilated worm or worm rack 10 with which meshes a worm gear 11 integral with the sector arm Q or which may be formed as an insert therein. The sector arm Q is fast on a shaft 12 which in turn operates the steering or pitman shaft.

The width of the nut worm rack is, preferably, greater than the corresponding sector worm to provide adjustment for localized wear in the centre ahead position as described hereinafter.

The position of the restraining and guiding slot 1 and its engaging roller action pin 2 will be so determined that, upon engagement of the worm rack 10 and worm gear sector 11, the former is centrally engaged over the whole width of the sector gear (see Figure 2) in the centre ahead position of the steering wheels.

In operation, assuming the case where the nut N instead of being held against rotation is permitted to rotate with and in the same direction as the screw S its relative axial displacement will be reduced, i. e. it loses motion. By causing the nut N to rotate in the opposite direction its relative motion to the screw shaft S will be greater, i. e. it is accelerated. Where the nut is completely restrained from rotation then the overall transmission ratio will be the same as the screw lead.

By introducing a second variable ratio drive between the nut N and the member Q it will give a second gear velocity ratio independent of that of the screw and nut N.

Referring now to Figure 1 and assuming that the nut N is located in a substantially central position lengthwise of the screw portion S of the steering column and further that the screw S consists of a left hand thread, rotation of the screw S to the left as indicated by the arrow $x'$, i. e. anti-clockwise, will normally produce a translational movement of the nut N in an upwards direction of the shaft (see arrow $x'$, Figure 2).

By suitable selection of the direction of the slot 1 it is possible to cause the nut N to rotate with the screw, in this case in an anti-clockwise direction, as seen in Figure 1, with the result that there is a reduction in the relative displacement of the nut N in the direction of the arrow $x'$ (Fig. 2) corresponding to a deceleration. This deceleration is obtained by a curvature of the slot 1 from a zero mid-position of the nut in a direction as seen in Figure 2 which is to the right as indicated by the arrow $y'$ in Figure 3.

Disregarding the gear ratio introduced by the worm rack 10 the sector Q will move with the nut N, that is anti-clockwise in respect of its axis 12 (Figure 2).

By introducing in the nut and sector gearing a thread of opposite hand to the thread of the screw S or, in other words, by cutting a right handed worm gear on the nut N, and since the nut is controlled to rotate anti-clockwise in this description, it will introduce a further partial lag or reverse motion (between the said nut and the sector) as indicated by the arrow Z (Figure 2), relative to the movement of the nut on its screw.

This will demand more turns on the steering hand wheel to produce a given angular displacement of the sector.

Assuming a screw lead of say ¾" and a lead of the worm and sector of two inches, or any other greater lead than the screw, the sector will be slowed down in its directional travel with the nut. This, then, will give a variation in the overall rato of the mechanism and an additional deceleraton of motion to that lost between the screw lead and its nut.

Similarly, if the screw (with L. H. thread) be turned to the right, the nut will travel downwards on the column away from the driver. If the nut be allowed to revolve to the right (clockwise around the screw) there is again relative deceleration between the screw and nut and between the nut and sector. The slot (in the nut) will be curved to the left as indicated by arrow y at its upper extremity when viewed in plan. The sector is being driven away from the driver and, again, the right hand worm thread 19 on exterior of nut N is "slipping" in its transfer of motion to the sector.

By the above means, we secure controlled variations of ratio between the screw and its driven sector, depending upon the shape of the slot which can be partly straight and partly curved.

By making the nut revolve anti-coincidentally with its driving screw we can obtain acceleration of relative motion and, in similar manner, in the above example, impart its effect to the greater lead on outside worm and sector, to obtain accelerated movement of the sector. In such a case, the slot is reversed in form, that is, in plan view 3 the end marked 1 would be to the left of drawing and the curvature would be to the right at opposite extremity.

If required, a zig-zag curvature of the slot would provide alternating accelerations and decelerations of the driven sector.

While it is preferred to cut the slot 1 in the nut N it should be understood that alternatively the positions of the slot and stud fixings may be reversed, that is the slot 1 may be cut in the housing or a cap piece thereto, and the stud 3 a fixture in the nut N.

In the preferred construction, see Figure 3, it is possible as shown, by mounting the stud 2 eccentrically in relation to the centre of the cap piece 4 to secure adjustments of the zero position of the stud 2, i. e. in a lengthwise and transverse direction relative to slot 1. This secondary adjustment is obtained by orientation of the cap piece 4. For instance, if turned say 90 degrees from the original position there will be two effects. Firstly, the point of contact between stud and nut slot will be changed and secondly, a slight initial rotary displacement will occur in the position of the nut. If it be turned 180 degrees the point of contact between stud and nut slot will again almost coincide, in plan view, but not in elevation, and the rotary displacement of the nut increased. Consequently, assuming the nut slot and outer worm rack to suffer some localized wear at the more constant points of contact, in the centre ahead driving position, an equalizing adjustment is provided for its distribution.

Another means of compensating for wear is to use a wheel instead of a sector on the driven shaft. By disengaging the said wheel it could be rotated to present an unused surface to the nut worm. The pitman shaft could be a taper splined fitting to the pitman arm or other driven element or the worm wheel would be so mounted on the shaft.

The slot 1 may be formed as a spherical or partly spherical section and the stud replaced by a steel ball held in a suitable seating. Alternatively, instead of a slot I may provide a machined rib formed on or attached to either the nut or a cover plate, in order to accelerate or decelerate the nut member, for engagement with pins, rollers or balls one located on each side of the rib.

As before indicated, the present invention also contemplates an assembly wherein the nut member constitutes the driving element of the combination and the screw member the driven element by means of which motion is transmitted to the steering mechanism. Such an arrangement is illustrated in Figures 4 and 5, where the nut member $N^1$ is formed as a part of the steering center column $N^2$ and is rotatably supported in a cylindrical extension of the housing $H^1$. In order to prevent longitudinal displacement of the nut $N^1$ in the housing $H^1$, a suitable thrust bearing may be provided at the top of the column or adjacent the nut, although such bearing is not illustrated in the drawings.

The screw member $S^1$ consists of a relatively short stem portion either threaded to engage complementary threads in the nut $N^1$ or the two members may be provided with a motion transmitting arrangement such as shown in my U. S. patent, No. 2,519,777, whereby motion of the nut $N^1$ may be transmitted to the screw by balls contained in a single helix or helices through a transfer passage as shown in Figure 4. The projecting end portion of the screw $S^1$ is enlarged as at 20 to form a cylindrical head, the top side of the periphery of which is provided with a guide slot 21 of a shape corresponding to that of the guide slot 1 which was previously described in connection with the first form of the invention. The guide slot 21 is engaged by a stud 22 provided with an anti-friction roller head 23, the stud preferably being rotatably carried in a detachably flanged cover plate 24 secured by set screws 25 to the wall of the housing $H^1$.

The opposite side of the periphery of the enlarged head 20 is provided with a mutilated worm or worm rack 30 which meshes with a worm gear 31 formed integral with the sector arm $Q^1$, the latter being rigidly fixed on a shaft 32 which operates the steering or pitman shaft. Otherwise the structure and relationship of the parts are similar to those previously described.

In the operation of this form of the invention, rotary movement of the steering column $N^2$ and with it the nut $N^1$, are translated to longitudinal movement of the screw $S^1$ and in turn, to movement of the steering sector $Q^1$. The slot 21 and stud 22 govern the rotation of the screw head 20 either clockwise or counterclockwise to the direction of rotation of the nut $N^1$, substantially the same as in the form previously described.

This particular form of the invention has the advantage of a short nut and screw in fabrication which overcomes the difficulty frequently encountered in thread-grinding long nuts.

Here again it will be understood that the slot 21 may be located in the adjacent inner face of housing $H^1$ and the pin 22 located in the enlarged head 20 of the screw $S^1$ and although such an arrangement is not illustrated, this variation is considered within the scope of the present invention.

In both forms of the invention above described the same basic principle is employed to obtain deceleration on both sides of the centre position between screw and nut, the slot being shaped to cause the continued rocking of the intermediate member in the same rotary direction as the driving member, substantially from lock to lock. The two "losses" are added to give progressive deceleration towards each lock from centre position.

The present invention deliberately avoids the natural result of an arcuate slot such as shown in my U. S. patent, No. 2,489,534, which from centre ahead, will give acceleration towards one lock and deceleration towards the other. As distinguished from this, the present invention provides deceleration towards both locks, whether the vehicle is turning right or left. Thus, regardless of the direction of turning of the vehicle, the steering wheel becomes easier to handle which, in the final analysis, is the primary object of the invention.

The ease of operation is effected through the deceleration from centre position towards each lock, both between the screw and nut and between the driven element and the sector wheel. The acceleration in this design occurs only when the gear is self-centering after a turn.

In this specification and in certain of the following claims, the intermediate element or screw engaging member is generally referred to as a nut because of the relationship of these two complementary parts, but it will be understood that in actual practice this intermediate element may be more in the form of an internally threaded sleeve.

From the foregoing it is believed that my invention may be readily understood by those skilled in the art without further description, it being borne in mind that numerous changes may be made in the details disclosed without departing from the spirit of the invention.

I claim:

1. In a screw and nut type actuating gear, the combination of a housing, a screw member and a complementary threaded sleeve member, one of which members is driven by the other, and a rocker arm to which motion of the driven member is transmitted through a worm and wheel linkage, said driven member and housing having adjacent areas provided with complementary guide means, said guide means comprising a guide slot formed in one of said areas to receive a stud located in the adjacent area, said guide slot traversing the longitudinal axis of said members, with intersection at their normal central position and with oppositely directed end portions whereby, upon relative rotation of the driving member, the driven member will partake of a controlled rotary motion coincident with respect to the driving member.

2. A combination as claimed in claim 1, wherein the driven member is connected to the rocker arm by a worm drive of opposite hand to that of the screw thread.

3. In a screw and nut actuating gear, the combination of a housing, a screw member and a nut member, one of which members is driven by the other, and a rocker arm to which motion of the driven member is transmitted through a worm and wheel linkage and in which the said driven member is formed with a guide slot to receive a stud carried by the housing, said guide slot traversing the longitudinal axis of said members, with intersection at their normal central position and with oppositely directed end portions whereby, upon relative rotation of the driving member, the driven member will partake of a controlled rotary motion coincident with respect to the driving member.

4. In a screw and nut actuating gear the combination of a housing member, a screw journalled in the housing, a nut member mounted on the screw and a rocker arm to which motion of the nut is transmitted in which a guide slot is provided in one of said members to receive a stud anchored to the other member, said guide slot having a central dwell portion connecting two end portions, the end portions being set at a predetermined angle to the axis of the screw to produce decelerated motion of the nut in relation to the screw, from centre position towards each end of the slot and in which the nut member is connected to the rocker arm by a worm drive of opposite hand to that of the screw and nut gear.

5. In a screw and nut actuating gear, the combination of a housing, a screw journalled in the housing, a nut mounted on the screw and a rocker arm to which motion of the nut is transmitted, in which the nut is formed with a slot to receive a stud fast with the housing, said slot having a central dwell portion connecting two end portions, the end portions being set at a predetermined angle to the axis of the screw to produce decelerated motion of the nut in relation to the screw, from centre position towards each end of the slot and in which the nut member is connected to the rocker arm by a worm drive of opposite hand to that of the screw and nut gear.

6. In a screw and nut actuating gear, the combination of a housing member, a screw journalled in the housing, a nut member mounted on the screw, and a rocker arm to which motion of the nut is transmitted in which a guide slot is provided in one of said members to receive a stud anchored to the other member and the nut member is connected to the rocker arm by a worm drive of opposite hand to that of the screw and nut gear, said guide slot for the nut member having a central portion which is straight and oppositely curved end portions.

7. In a screw and nut actuating gear, the combination of a housing, a screw journalled in the housing, a nut mounted on the screw and a rocker arm to which motion of the nut is transmitted, in which the nut is formed with a slot having a straight central portion and oppositely curved end portions, and a stud carried by the housing rides in the slot, motion of the nut being transmitted to the rocker arm by a worm rack on the nut in mesh with a worm gear on the rocker arm.

8. In a screw and nut actuating gear, the combination of a housing, a screw journalled in the housing, a nut mounted on the screw and a rocker arm movable by the nut in which the nut member is formed with a slot extending substantially longitudinally thereof, and the housing is provided with an adjustable seating for mounting a stud in operative engagement with the slot in the nut, said slot having a central dwell portion connecting two end portions, the end portions being set at a predetermined angle to the axis of the screw to produce decelerated motion of the nut in relation to the screw, from centre position towards each end of the slot, motion of the nut being transmitted to the rocker arm by a worm rack thereon in mesh with a worm gear on the rocker arm.

9. In screw and nut actuating gear, the combination of a housing, a screw journalled in the housing, a nut mounted on the screw and a rocker arm movable by the nut in which the nut member is formed with a slot extending substantially longitudinally thereof, said housing having a detachable wall plate, circularly disposed fixing means for fixing the plate to the housing and a seating for said stud which is eccentric with respect to said fixing means, whereby said stud is adjustably mounted in operative engagement with the slot in the nut, motion of the nut being transmitted to the rocker arm by a worm rack thereon in mesh with a worm gear on the rocker arm.

10. In screw and nut actuating gear, the combination of a housing, a screw journalled to rotate in the housing, a nut carried by the screw and a rocker arm movable by the nut in which the interengaging means is provided respectively on the nut and housing, said means including a slot on one part to receive an actuating element anchored to the other part, said slot having a central dwell portion joining two end portions, which end portions are set at a predetermined angle to the axis of the screw to introduce an accelerated and decelerated motion of the nut as required in relation to the screw on rotation of the latter and in which the motion of the nut is transmitted to the rocker arm by a worm drive whereby the translation of the nut along its screw thread and of the rocker arm in respect to the nut may be varied.

11. The combination claimed in claim 10 in which the interengaging means between the nut and housing comprises a slot of spherical cross section on one part and a steel ball riding in the slot and anchored to the other part.

12. The combination claimed in claim 10 in which the interengaging means between the nut and housing comprises a rib on one part and associated elements on the other part in contact with opposite sides of the rib.

13. In a screw and nut actuating gear, the combination of a housing, a nut member journalled in the housing, a screw member mounted in the nut member, and a rocker arm to which motion of the screw member is transmitted in which a guide slot is provided in the screw member to receive a stud anchored in the housing, said screw member being connected to the rocker arm by a worm drive of opposite hand to that of the screw and nut gear, said guide slot for the screw member having a central portion which is straight and oppositely curved end portions.

14. A combination as claimed in claim 13, wherein the screw member is provided with an enlarged substantially cylindrical head, said guide slot and worm drive being located on opposite sides of the periphery of said head.

ALFRED PAUL MILL COCHRANE.

REFERENCES CITED

The following references are of record in the file of this patent:

UNITED STATES PATENTS

| Number | Name | Date |
|---|---|---|
| 754,068 | Iden | Mar. 8, 1904 |
| 923,230 | Wilt, Jr. | June 1, 1909 |
| 927,143 | Hill | July 6, 1909 |
| 1,009,910 | Lord | Nov. 28, 1911 |
| 1,065,183 | Stanley | June 17, 1913 |
| 1,142,377 | Stanley | June 8, 1915 |
| 1,331,026 | Ross | Feb. 17, 1920 |
| 1,429,103 | Ross | Sept. 12, 1922 |
| 1,602,057 | Van Sant et al. | Oct. 5, 1926 |
| 2,093,298 | Welsh | Sept. 14, 1937 |
| 2,119,705 | De Vlieg | June 7, 1938 |
| 2,266,923 | Trbojevich | Dec. 23, 1941 |
| 2,267,524 | Hawkins | Dec. 23, 1941 |

FOREIGN PATENTS

| Number | Country | Date |
|---|---|---|
| 394,559 | France | Jan. 27, 1909 |
| 397,403 | France | Feb. 24, 1909 |
| 287,889 | Germany | Nov. 22, 1914 |
| 338,431 | Germany | June 17, 1921 |
| 523,964 | Great Britain | July 26, 1940 |
| 596,267 | Great Britain | Dec. 31, 1947 |
| 596,268 | Great Britain | Dec. 31, 1947 |
| 605,205 | Great Britain | July 19, 1948 |